United States Patent
Chou (10) Patent No.: US 9,344,835 B2
(45) Date of Patent: May 17, 2016

(54) MACHINE-TO-MACHINE (M2M) COMMUNICATIONS USING SHORT MESSAGE SERVICES (SMS)

(75) Inventor: Joey Chou, Scottsdale, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/994,115

(22) PCT Filed: Dec. 19, 2011

(86) PCT No.: PCT/US2011/065847
§ 371 (c)(1),
(2), (4) Date: Nov. 22, 2013

(87) PCT Pub. No.: WO2013/009345
PCT Pub. Date: Jan. 17, 2013

(65) Prior Publication Data
US 2014/0073367 A1    Mar. 13, 2014

Related U.S. Application Data

(60) Provisional application No. 61/507,927, filed on Jul. 14, 2011.

(51) Int. Cl.
*H04W 4/00* (2009.01)
*H04W 4/14* (2009.01)
*H04W 88/16* (2009.01)

(52) U.S. Cl.
CPC ............. *H04W 4/005* (2013.01); *H04W 4/14* (2013.01)

(58) Field of Classification Search
CPC ......... H04W 4/005; H04W 4/14; H04W 8/04; H04W 8/26; H04W 4/001; H04W 76/02; H04W 12/04; H04W 36/0022; H04W 36/04; H04W 36/14; H04W 4/00; H04W 4/06; H04W 52/0216; H04W 64/00; H04W 68/025; H04W 4/20
USPC ........... 455/406, 412.1, 418, 426.1, 450, 466, 455/445, 41.2, 414.1; 370/221, 310.328, 370/329; 709/204, 206, 221, 223, 227
See application file for complete search history.

(56) References Cited

U.S. PATENT DOCUMENTS

| | | | |
|---|---|---|---|
| 7,774,008 B2 | 8/2010 | Benaouda et al. | |
| 2008/0064395 A1* | 3/2008 | Sibileau | 455/433 |

(Continued)

FOREIGN PATENT DOCUMENTS

WO    2013/009345 A1    1/2013

OTHER PUBLICATIONS

International Search Report and Written Opinion received for PCT application No. PCT/US2011/065847, mailed on Jul. 30, 2012, 9 Pages.

(Continued)

*Primary Examiner* — Inder Mehra
(74) *Attorney, Agent, or Firm* — Thorpe North & Western LLP (57) ABSTRACT

A technology is described for machine-to-machine communications using short message services (SMS). The method may include receiving a SMS message over a network into an M2M gateway module from an M2M Server via a short message service center (SMSC) device. A SMS payload of the SMS message originating from the M2M server can be embedded into a signaling message using the M2M gateway module and Base Station. The SMS signaling message can be sent from the M2M gateway module to the M2M device to communicate with the M2M device.

22 Claims, 12 Drawing Sheets

(56) References Cited

U.S. PATENT DOCUMENTS

| | | | | |
|---|---|---|---|---|
| 2008/0153521 | A1* | 6/2008 | Benaouda et al. | 455/466 |
| 2011/0098020 | A1* | 4/2011 | Van Loon et al. | 455/411 |
| 2011/0237281 | A1* | 9/2011 | Busropan | G01D 4/002 |
| | | | | 455/507 |
| 2012/0087274 | A1* | 4/2012 | Meriau | 370/253 |
| 2012/0178464 | A1* | 7/2012 | Li et al. | 455/450 |
| 2012/0252481 | A1* | 10/2012 | Anpat et al. | 455/456.1 |
| 2013/0072245 | A1* | 3/2013 | Lee et al. | 455/509 |
| 2013/0109371 | A1* | 5/2013 | Brogan et al. | 455/420 |
| 2013/0178232 | A1* | 7/2013 | Claussen et al. | 455/456.2 |
| 2013/0258938 | A1* | 10/2013 | Sagfors et al. | 370/312 |
| 2014/0258127 | A1* | 9/2014 | Chava | 705/44 |
| 2014/0269283 | A1* | 9/2014 | Shaheen | 370/230 |

OTHER PUBLICATIONS

Chou "A solution to transmit SMS over 802.16 networks" IEEE 802.16 Broadband Wireless Access Working Group, IEEE C802.16p-11/0149, Jul. 9, 2011, pp. 1-8.

Li et al.,"M2M Short Message Services in 16m" IEEE 802.16 Broadband Wireless Access Working Group, IEEE C802.16p-11_0164, Jul. 10, 2011, pp. 1-5.

Li, et al., "M2M Short Message Services in 16e", IEEE 802.16 Broadband Wireless Access Working Group, IEEE C802.16p-11_0163, Jul. 10, 2011, pp. 1-9.

International Preliminary Report on Patentability and Written Opinion received for PCT Patent Application No. PCT/US2011/065847, mailed on Jan. 23, 2014, 6 pages.

* cited by examiner

| Areas of comparison | M2M communications | Human communications |
|---|---|---|
| Message size | Shorter message | Longer messages |
| Message types | Machine languages | Multimedia – e.g. voice, video, text |
| Scheduling of data transmission | Deterministic | Indeterministic |
| Length of data session | Short | Long |
| Frequency of data transmission | Less frequently (e.g. in hours, days, or weeks interval) | More frequently |
| Traffic bias | Uplink bias (e.g. measurement report) | Downlink bias (e.g. Internet surfing, video streaming) |
| Traffic initiation | Server centric (e.g. periodic report polled by the M2M server.) | User centric (e.g. user intiates a call or data session.) |
| Traffic peak hours | No specific peak hours | Aligned with human activities |
| Mobility | Stationary | Mobile |

MACHINE-TO-MACHINE (M2M) COMMUNICATIONS USING SHORT MESSAGE SERVICES (SMS)

CLAIM OF PRIORITY

Priority to U.S. Provisional patent application Ser. No. 61/507,927, filed on Jul. 14, 2011 is claimed.

BACKGROUND

The Internet has been expanding into a more mobile Internet by using radio cellular technologies to connect billions of people and electronic devices. An Internet of Things (IoT) is what some people envision to expand the communication landscape for the majority of electronic devices.

IoT refers to the connection of billions of physical or virtual objects on the Internet cloud. This enables these objects to exchange information not only among themselves but with the environments and servers that provide services to benefit the devices and end users. Although this concept seems simple, there are significant challenges in wirelessly communicating with billions of objects.

Mobile internet services are mainly designed for human communications that include both human-to-human and human-to-server communications. Even though human communications utilize many devices, such as personal computers (PCs), notebooks, tablets, and smartphones, such devices provide similar interfaces and services to users (e.g. video, voice, and multimedia). In contrast, the machine-to machine (M2M) communication market is highly fragmented, with different vertical sectors that target different services ranging from telemetry (e.g. smart meter, remote monitoring), telematics (e.g. fleet tracking), to surveillance video. These M2M services have very different specifications. For example, surveillance video uses video codecs and protocols for streaming video uploads that are not desired for telemetry applications. It may be difficult to use a common wireless technology for devices supporting various M2M services, since it will be so expensive and complicated to scale for billions of devices.

DETAILED DESCRIPTION

Reference will now be made to the examples illustrated in the drawings, and specific language will be used herein to describe the same. It will nevertheless be understood that no limitation of the scope of the technology is thereby intended. Alterations and further modifications of the examples illustrated herein, and additional applications of the technology as illustrated herein, which would occur to one skilled in the relevant art and having possession of this disclosure, are to be considered within the scope of the invention.

The internet is expanding to reach billions of physical or virtual objects and to create an "Internet of Things" (IoT). Machine-to-Machine (M2M) communications, based on wireless technologies, can aid in helping realize the IoT vision. However, the recent explosive growth of smart phones and tablets is taking a toll on the performance of many mobile broadband networks. Adding a large number of M2M devices to communicate over an already congested network can slow down mobile Internet communication channels dramatically.

M2M devices can communicate over the Internet using SMS (Short Message Service) messages. SMS is becoming a widely used transmission mechanism for M2M communication, since it is ubiquitous, simple, and inexpensive. Moreover, the small message payload of SMS is useful as a mechanism to support telemetry applications. However, SMS inherits significant overhead from existing wireless protocols that may reduce the ability of M2M communications to operate efficiently in a wireless cellular communication system.

A technology is described to optimize the transmission of SMS messaging over a network using a RAN (Radio Access Network). Previous approaches have mainly focused on the optimization of spectrum efficiency over the air interface, while this technology improves the behavior of both M2M applications and the RAN to optimize the overall network efficiency and to mitigate the congestion issues.

Figure 1:
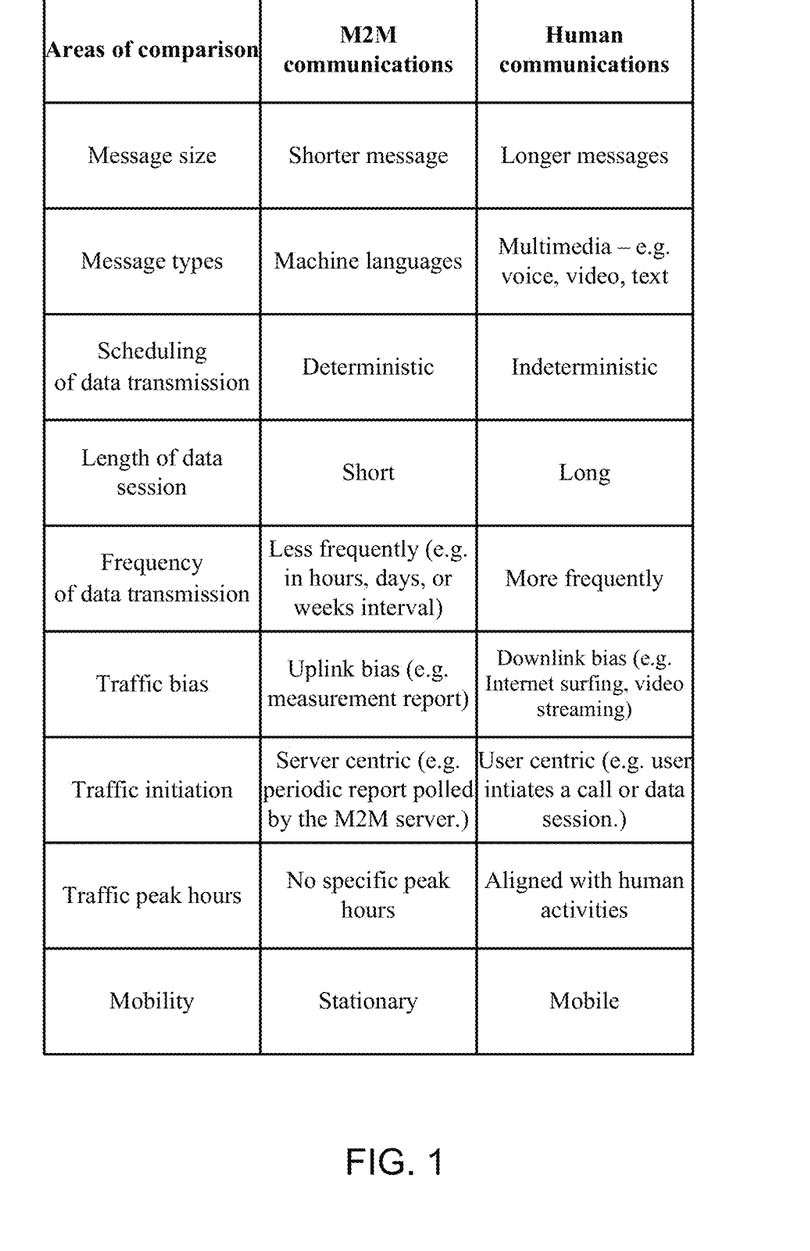
FIG. 1 is a table comparing the traffic characteristics of M2M communications used for simple telemetry applications to human communications in accordance with one example comparison.

The requirements of M2M communications are quite different from human communications, FIG. 1 compares the traffic characteristics of M2M communications used for simple telemetry applications to human communications. This technology can provide an optimized solution for transmitting SMS messages over the RAN by using the differences between these two types of communication.

Figure 2:
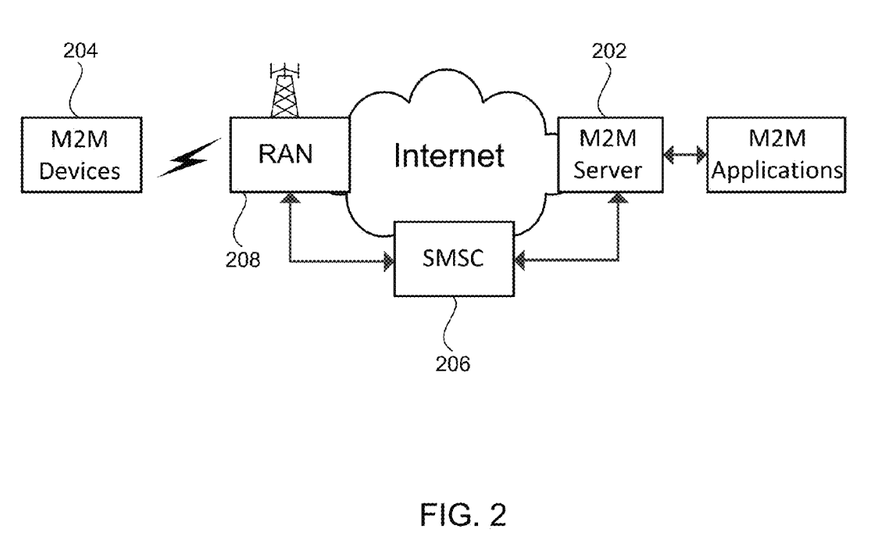
FIG. 2 illustrates an example of an M2M communication network architecture.

FIG. 2 illustrates an example of an M2M communication network architecture. The M2M server 202 can communicate with M2M devices 204 by sending SMS messages to the SMSC (Short Message Service Center) 206. The SMSC then forwards the SMS messages to the appropriate M2M device using the RAN 208.

SMS is lower cost and more efficient in terms of bandwidth usage than voice services, but the overhead of signaling protocols needed to deliver the short messages remains relatively high. As shown in the table of FIG. 1, the transmission of M2M data is likely to occur less frequently and is more concise than human communications. Therefore, the M2M device is preferably in idle mode most of the tune in order to save power. The M2M device can wake up at the interval of a paging cycle to listen to the advanced air interface paging message (i.e., AAI-PAG-ADV) that signals the presence of downlink data.

Figure 3:
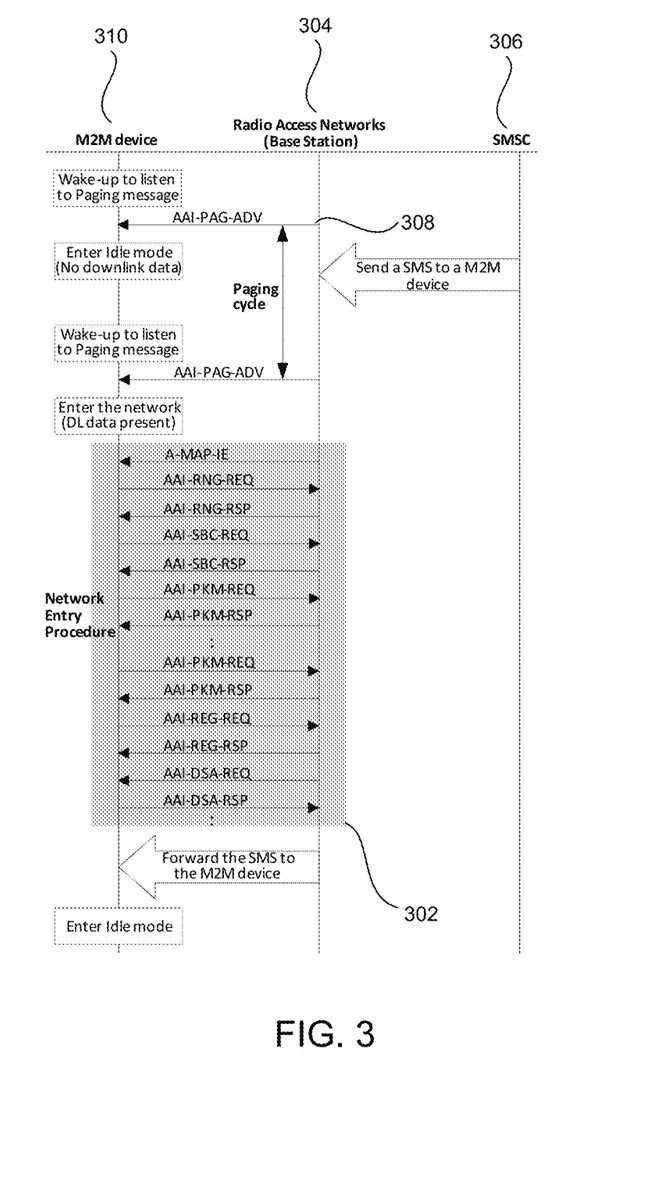
FIG. 3 is a chart illustrating M2M device exchanges during an example network entry procedure.

FIG. 3 shows the control flow diagram for SMS transmission over the RAN, based on IEEE 802.16m 2009. When the base station (BS) 304 receives an SMS from SMSC 306, the BS can signal the M2M device to enter the network in the AAI-PAG-ADV message 308. As shown in FIG. 3, the M2M device exchanges more than 10 messages 302 with the BS to perform synchronization, ranging, capability negotiation, registration, authentication, connection establishment, and IP address allocation during the network entry procedure. The BS then forwards the SMS message to the M2M device 310 on the connection being established.

Another attribute of M2M communications, as shown in Table 1, is the short data session that may simply consist of a request and a response. Thus, the M2M device can enter idle mode again after the session. This communication scenario is highly inefficient because the signaling overhead resulting from network entry and network exit procedures is many times bigger than the M2M payload data, which may be just a few bytes.

SMS enables cellular operators to quickly deliver M2M service without any major network overhaul. But, SMS incurs huge overhead from the signaling protocol, as described in above. The present technology optimizes SMS transmissions over the RAN.

Figure 4:
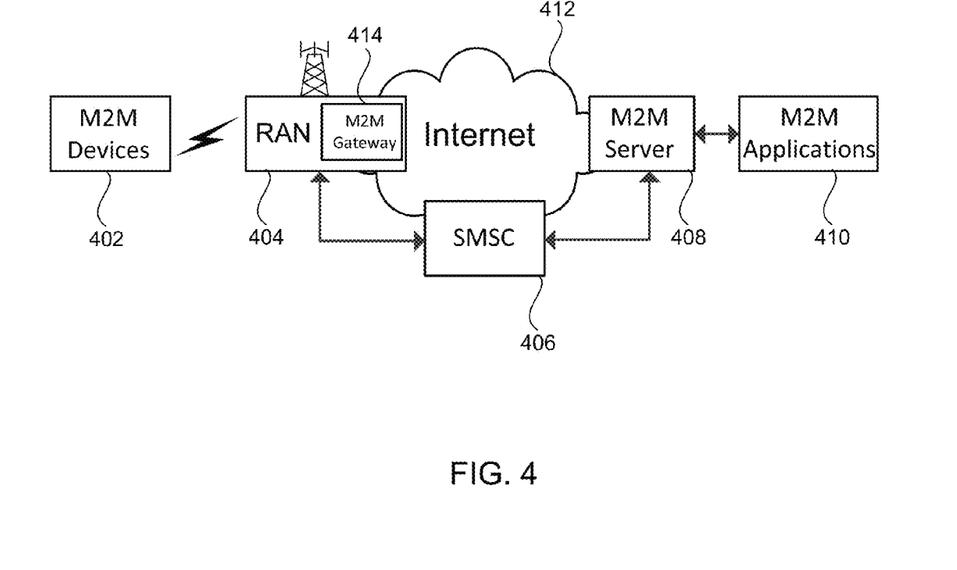
FIG. 4 illustrates an example system for M2M communications using short message services (SMS).

FIG. 4 illustrates a system for machine-to-machine communications using short message services (SMS). The system can include a machine-to-machine (M2M) device 402 to receive operation instructions via signaling messages over a network 412. An M2M server 408 can send SMS messages to the M2M device and the SMS messages can contain operation instructions. A short message service center (SMSC) 406 may forward SMS messages from the M2M server 408 through the network 412.

A machine-to-machine (M2M) gateway module 414 can convert SMS messages received from the short message service center (SMSC) into the signaling messages destined for the M2M device 402. In other words, the SMS message from the M2M server can be encapsulated in the signaling message. This conversion can be effective because of the characteristics of SMS messages between machines include: short M2M sessions and short payload sizes, as explained by FIG. 1. A signaling message is a network entry procedure message communicated between the RAN 404 and the idle M2M devices. Examples of signaling messages that can be used to send and receive the encoded format messages can include an advanced air interface range response message (AAI-RNG-RSP), an advanced air interface range request message (AAI-RNG-REQ), an advanced air interface range acknowledgement (AAI-RNG-ACK), and an advanced air interface paging advertisement message (AAI-PAG-ADV). Other types of network entry procedure messages may be used as well.

Returning to FIG. 4, the M2M GWF or M2M gateway module can receive operation messages contained in signaling messages from an M2M server 408 which are destined for a machine-to-machine (M2M) device 402 over the network 412. The M2M gateway module can then perform the storing and forwarding functions by analyzing and forwarding the SMS data to M2M devices using the signaling messages.

A radio access network (RAN) 404 can communicate the SMS messages to the M2M device 402 using wireless communications. The RAN can include a wireless base station (BS). The M2M device can be considered a user equipment device (UE) that communicates with the BS. The M2M device will typically include a transceiver configured to communicate with the RAN and at least one sensor configured to perform a measurement. The wireless BS can be an enhanced NodeB as defined by the 3GPPP LTE specification releases 8-10. The BS can also be configured to operate based on the Institute of Electrical and Electronics Engineers (IEEE) 802.16 standard, including the IEEE 802.16 2009 standard and the IEEE 802.16m 2011 standard.

FIG. 4 also illustrates that M2M applications 410 can be executing on the M2M server 408. Example of M2M applications are smart meter applications and TeleHealth applications. For smart meter applications, the M2M application can provide a user interface for operators to schedule the time when the smart meters are to be read. Then, the M2M server will send a SMS at the scheduled time to read the smart meter.

Figure 5:
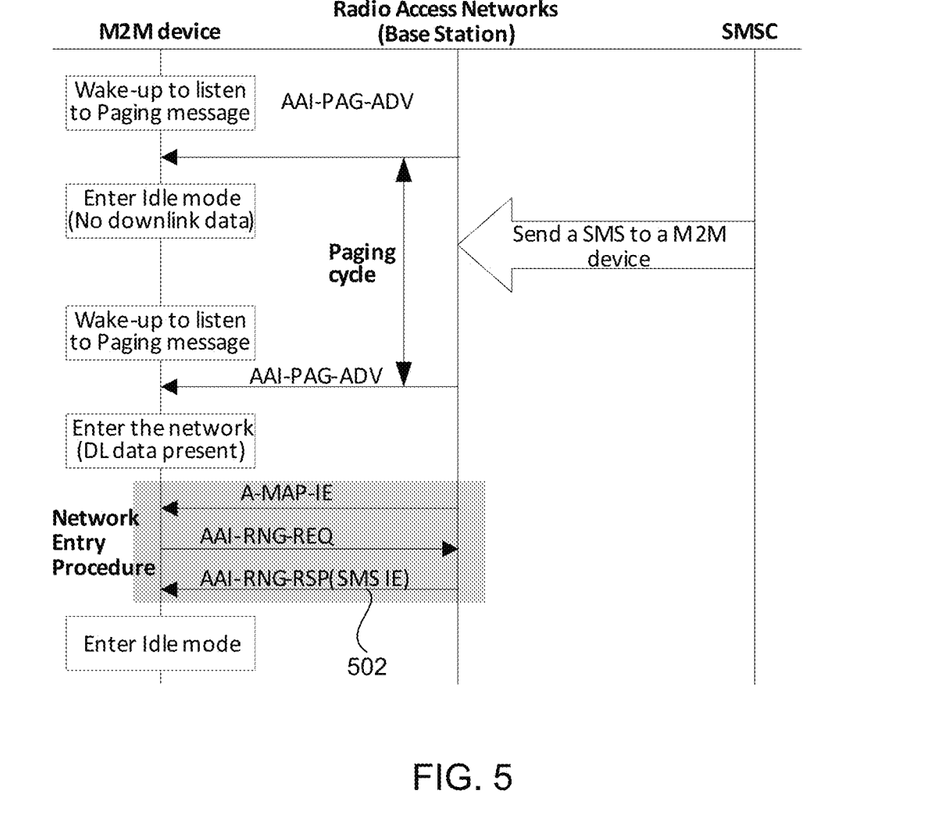
FIG. 5 depicts an example control flow of SMS relay network architecture.

FIG. 5 depicts the control flow of SMS relay network architecture. Due to the characteristics of a short data session and short payload for SMS messages, the creation of a bearer channel during the network entry to transport the M2M data can be very inefficient. In addition, a bearer channel also needs to be torn down after the bearer channel session ends. FIG. 5 shows that the SMS payload can be carried in an SMS IE (Information Element) in a range response (AAI-RNG-RSP) message 502 without the need to create a bearer channel. Therefore, the number of messages exchanged during the network entry may be reduced to three messages. This significantly increases the speed in which an M2M device can communicate with the RAN and send or receive data. The reduced number of messages exchanged during network entry can also decrease the load on the RAN, thereby enabling a greater number of M2M devices to communicate with the RAN without overburdening the RAN.

Machine Language

The communication overhead between machines can also be reduced by using an M2M machine language and M2M message type for communication with M2M devices. Since only machines are communicating, transmitting the M2M data in the human readable format is not necessary. For example, the M2M server can send a machine language code to the M2M gateway module so that it can be encapsulated in a signaling message. In an alternative example, a plain text message from the M2M server can be converted by the M2M gateway module into an encoded format and encapsulated in the signaling message.

Typically, interfaces with M2M devices operate using sense and control points that are controlled by the M2M server through read and write operations, respectively. For example:

Control points: Turning on the heater or setting a cooling temperature for the air conditioning.

Sense points: Reading the smart meters or the status of a security system.

Thus, the operation messages can include read messages with sense points and write messages with control points for the M2M device.

Figure 6:
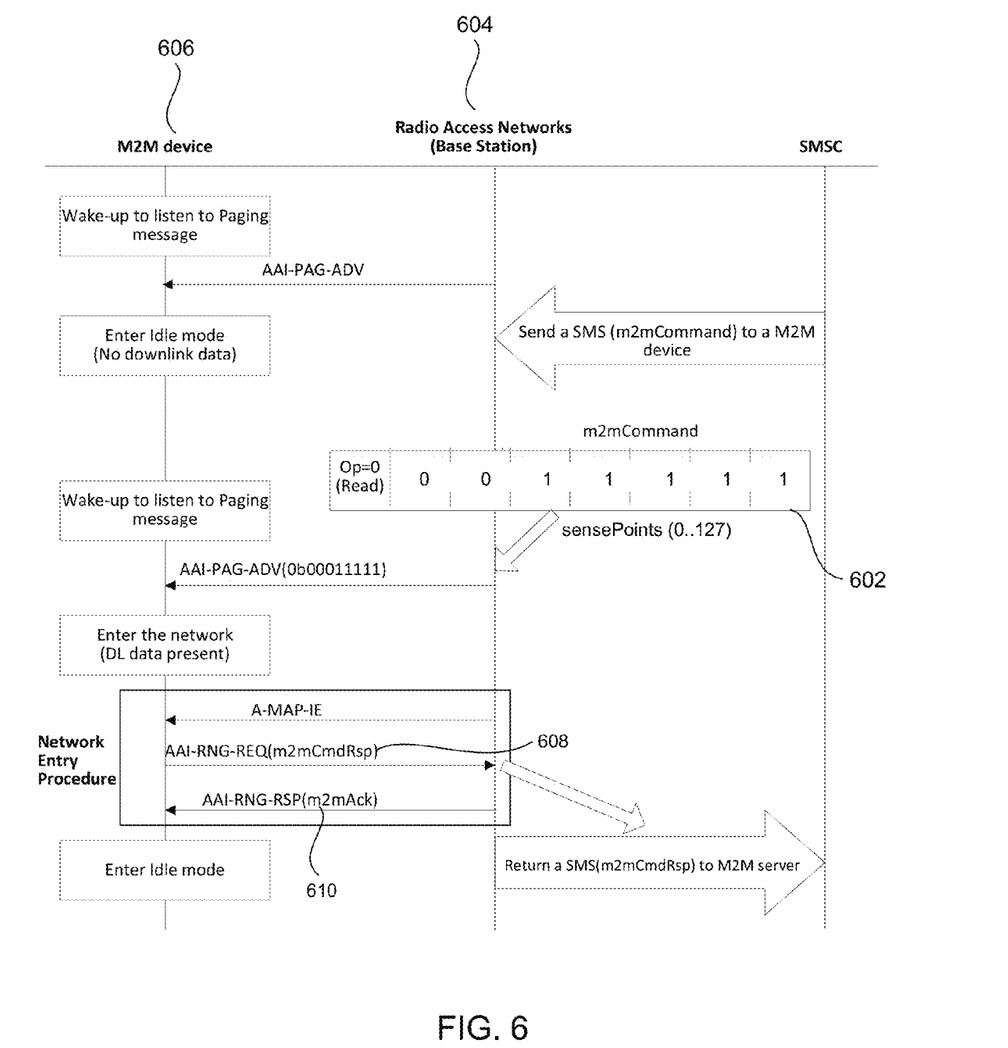
FIG. 6 illustrates an example of a control flow for the M2M sense points operation.

FIG. 6 illustrates an example of the control flow of the M2M sense points operation (i.e. a read operation). The M2M server can send an SMS M2M command to the M2M device during the paging procedure with a one byte m2mCommand 602 that consists of one-bit operation code for a read operation (i.e., (Op)=0), and 7 bits representing sense points that allow the machine to identify what type of data will be read. The function of sense points can be configured before the M2M device is deployed into the field. The M2M operator may also reprogram the sense point operations through the management interface to the M2M device after the deployment.

When the BS 604 receives the m2mCommand field from the M2M server, the M2M GWF or M2M gateway module will include the m2mCommand=0b00011111 in the AAI-PAG-ADV message in this example. For example, the 7 bit value sensePoints=0x1f may be used to identify the operation of reading the power usage measured by a smart power meter.

When the M2M device 606 is paged, the device can include an M2M command response that can be embedded in the advanced air interface range request (AAI-RNG-REQ) message, as represented by the m2mCmdRsp field 608 in the AAI-RNG-REQ message. The M2M GWF can include the m2mCmdRsp field in an SMS to be forwarded to the SMSC or M2M server. The M2M GWF can send an m2mAck message in the advanced air interface range response (AAI-RNG-RSP) message 610 to confirm whether or not the m2mCmdRsp was received successfully. Therefore, the M2M data sent over the air interface can be reduced to just a few bytes. The maximum size of SMS data is 140 bytes, and the range response message has an SMS data IE that is 140 bytes. In this example, the command response message may use the entire 140 bytes of data since there is no one byte opcode that is being used in the uplink transmission. Alternatively, a different number of bytes can be allocated to the M2M communications.

Figure 7:
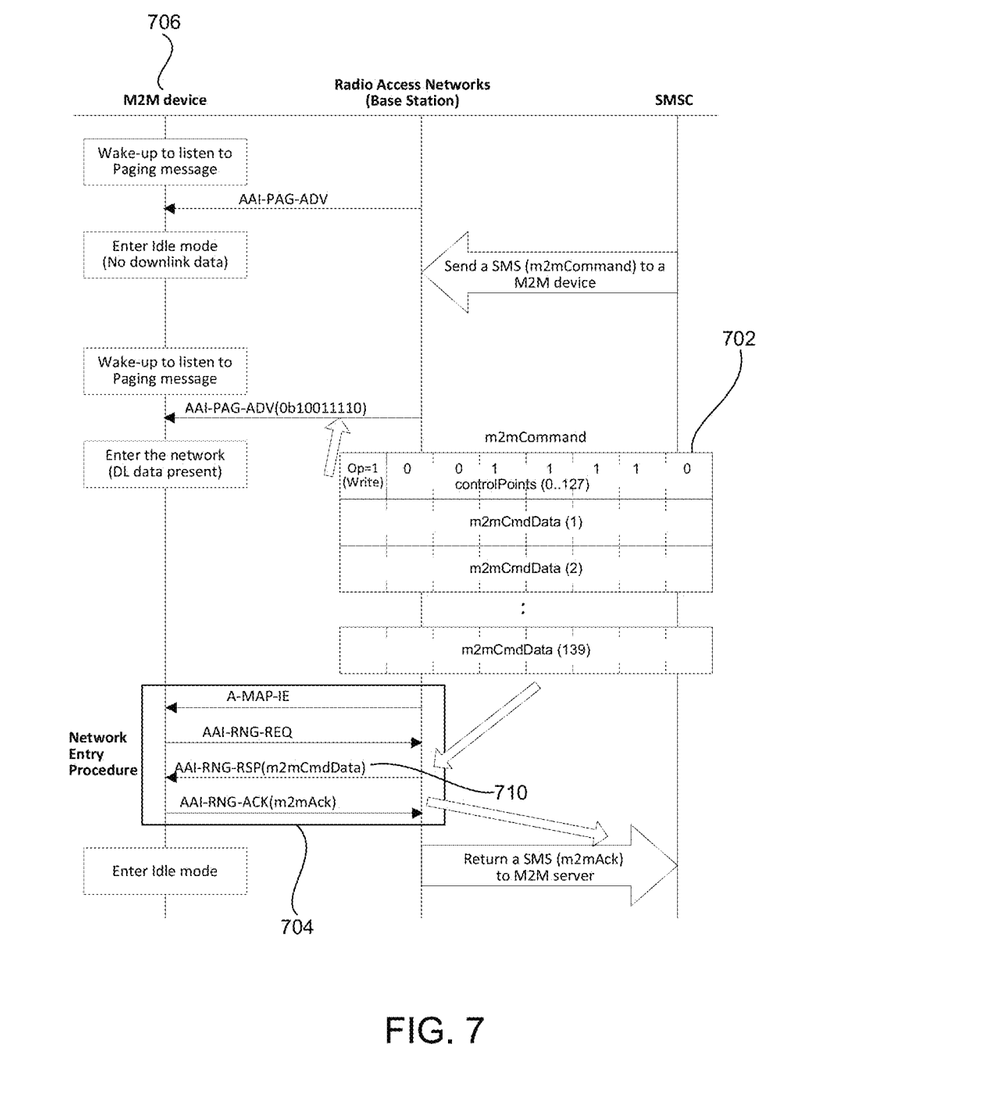
FIG. 7 illustrates an example of a control flow for the M2M control points operation.

FIG. 7 illustrates an example of the control flow of the M2M control points operation (i.e. a write operation). The M2M server can send an SMS message with m2mCommand 702 that consists of a 1-bit operation code for a write operation (i.e., Op=1), 7-bits for controlPoints identifying what type of data will be written, and up to 139 bytes m2mCmdData. For example, a 7-bit controlPoints=0x1e may refer to the operation of setting (i.e. writing) a cooling temperature for the air conditioning at the M2M device 706. The M2M device 706 can then enter the network by sending a range request message in a Random Access Channel (RACH) procedure to the base station. The base station can send the range response message 710 to the M2M device that includes up to 139 bytes of command data (m2mCmdData) in this example, since the first byte of the SMS data is used for an M2M control points that are sent over the AAI-PAG-ADV message. The M2M device can then send a range acknowledgement that includes an m2mAck message acknowledging that the command data was received. The M2M device then returns an AAI-RNG-ACK message 704 with the acknowledge m2mAck that can be forwarded to the M2M server in an SMS to indicate the result of the operation. The M2M device can then enter an idle mode to save power. The ability to enter the RAN and receive the command data with only four communications in the network entry procedure can significantly reduce the amount of power used by the M2M device during communication. As previously discussed, the reduced number of messages during the network entry procedure can also allow the RAN to communicate with more M2M devices without being overburdened.

SMS Polling Services

The scheduling of uplink or downlink data transmission for human communications is generally non-deterministic, since a user may decide to initiate communications at any given time. In contrast, the data transmission of M2M communications is deterministic and controlled by the M2M server. Therefore, the M2M server can send SMS messages to poll the M2M devices periodically or at scheduled intervals to retrieve measurement reports. The polling services of the M2M server can be coordinated with the paging cycles of the M2M device set by the M2M gateway device or the M2M server. For instance, the M2M device can be scheduled to wake up from idle mode at a time defined by SMS messages from the M2M gateway device.

Figure 8:
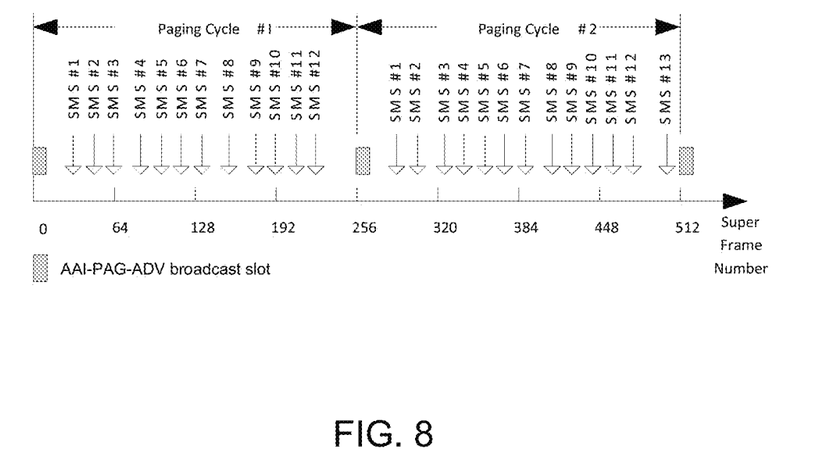
FIG. 8 illustrates an example of a schedule for M2M data transmissions as controlled by the SMS messages received from the M2M server.

FIG. 8 shows an example of the scheduling of M2M data transmission that is controlled by the SMS messages received from the M2M server. In this example, multiple SMS messages from the M2M server can be combined into a single signaling message by the M2M gateway module and a single paging advertisement signaling message is then broadcasted to multiple M2M devices. The M2M devices wake up from the idle mode at the interval of a paging cycle to listen to the AAI-PAG-ADV message. Within paging cycle #1, M2M server sends 12 SMSs (i.e. SMS #1-#12) to 12 M2M devices. At superframe 256, the M2M gateway module will include 12 m2mCommand messages received from 12 SMSs in an AAI-PAG-ADV message.

In FIG. 8, the paging cycle is 256 superframes and that is equivalent to ~5 sec (assuming 20 ms superframe). Each AAI-PAG-ADV can page up to 32 devices. Typically, the average number of SMS that can be sent each minute is about 6 to 30 SMSs, which is much smaller than the number of M2M devices the AAI-PAG-ADV message can page (i.e. 32×60/5=384 SMS per minute). Therefore, the number of uplink M2M transmissions is actually gauged by how fast the SMS can be received by the SMSC.

As shown in FIG. 8, there may be up to a 5-second latency for the SMS to arrive at the M2M device. The latency can be reduced by setting a smaller paging cycle. But that will impact the battery life of the device, since the device may wake up more frequently to listen to the AAI-PAG-ADV message.

Adaptive Paging to SMS Traffic Patterns

The technology described in the examples above does not include any dependency between the M2M server and the RAN. Basically, the M2M server and RAN operate independently. If there are 2000 M2M devices in a cell, then all 2000 M2M devices need to wake up every five seconds to listen for the AAI-PAG-ADV message. Since the M2M server can retrieve data from just a small number of devices in a specific time period, the majority of the M2M devices are not paged, and will just re-enter idle mode without entering the network. This is not very efficient, as the frequent paging may drain the battery life of M2M devices quickly.

As shown in FIG. 1, M2M communications have traffic patterns of periodic report and infrequent data transmission. Further optimization can be achieved based on these traffic patterns. For instance, the M2M gateway module can divide a plurality of M2M devices into paging groups and each paging group may be assigned a defined paging cycle time schedule. The separate paging cycles can also be defined by giving each paging group an offset from a scheduled paging start time.

Figure 9:
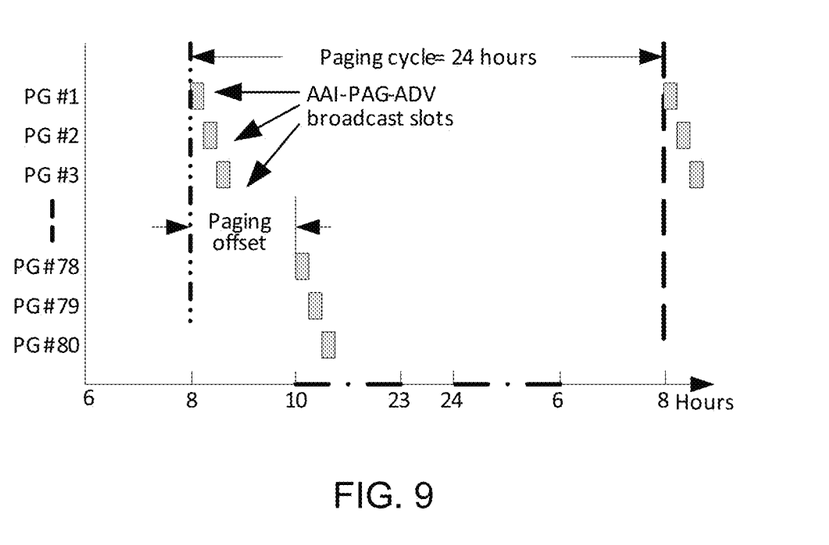
FIG. 9 is a chart illustrating an example of a plurality of M2M devices divided into paging groups and each paging group is assigned a defined paging cycle time schedule.

For example, the M2M operator may be configured to read the power usage of 2000 smart meters located in a cell daily. The M2M operator can have a fixed schedule (e.g. 8:00) each day to begin reading the report. Initially, the BS sets the paging cycle to 5 seconds, as shown in FIG. 9. At 8:00, the M2M server can start sending the SMSs to M2M GWF or M2M gateway module to read 2000 smart meters.

After several days, the M2M GWF (or M2M gateway module) can identify the traffic pattern of these SMS messages, and can reconfigure the paging cycles accordingly to adapt to the traffic patterns. As shown in FIG. 9, for example, the M2M server starts to send SMS to query 2000 M2M devices sequentially at 07:55. At the 5 minute interval between 07:55 to 08:00, the M2M gateway module receives 20 SMS messages destined for 20 M2M devices that are assigned to Page Group 1 (PG #1). Based on this SMS traffic pattern, the BS should have set the paging cycle, and paging offset for these 20 devices, so they can wake up at 08:00. At the 5 minute interval between 08:00 to 08:05, the M2M gateway module receives another 18 SMS, destined for 18 M2M devices that are assigned to Page Group 2 (PG #2). Based on this SMS traffic pattern, the BS should have set the paging cycle, and paging offset for these 18 devices, so they can wake up at 08:05 to listen to the paging advertisement message. In this example, the paging offset for PG#1 is 0, PG#2 is 5 minutes, PG#3 is 10 minutes, and so on. Other paging offset interval values may also be used. In other words, a machine-to-machine (M2M) gateway module can be configured to receive read and write operations contained in signaling messages from an M2M server which are destined for a machine-to-machine (M2M) device. The M2M gateway module can monitor developing patterns and setup or modify the paging schedules of M2M data transmissions using SMS messages to match the paging schedules to the changing messaging patterns. More specifically, the M2M gateway module can identify a traffic pattern or history of SMS messages sent to the M2M device from the M2M server and configure the M2M device paging cycles and paging schedule to match the historical traffic pattern.

Figure 10:
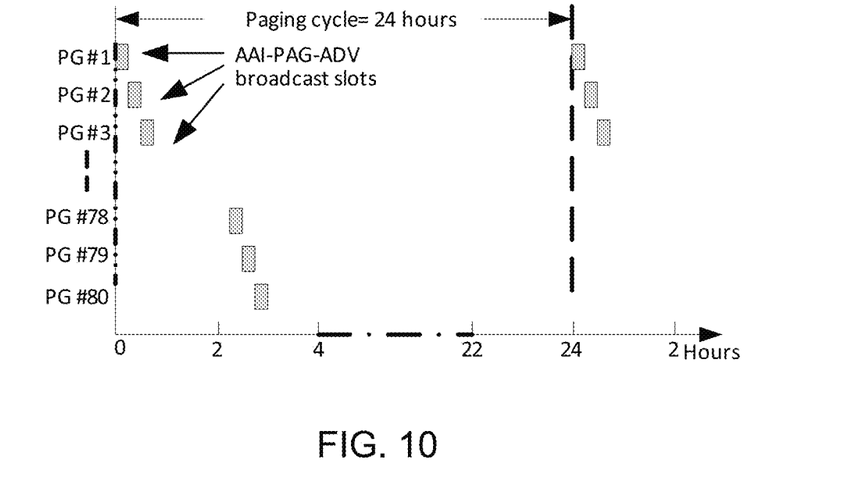
FIG. 10 is chart illustrating an example of adaptive paging cycles according to desirable M2M traffic patterns.
Figure 11:
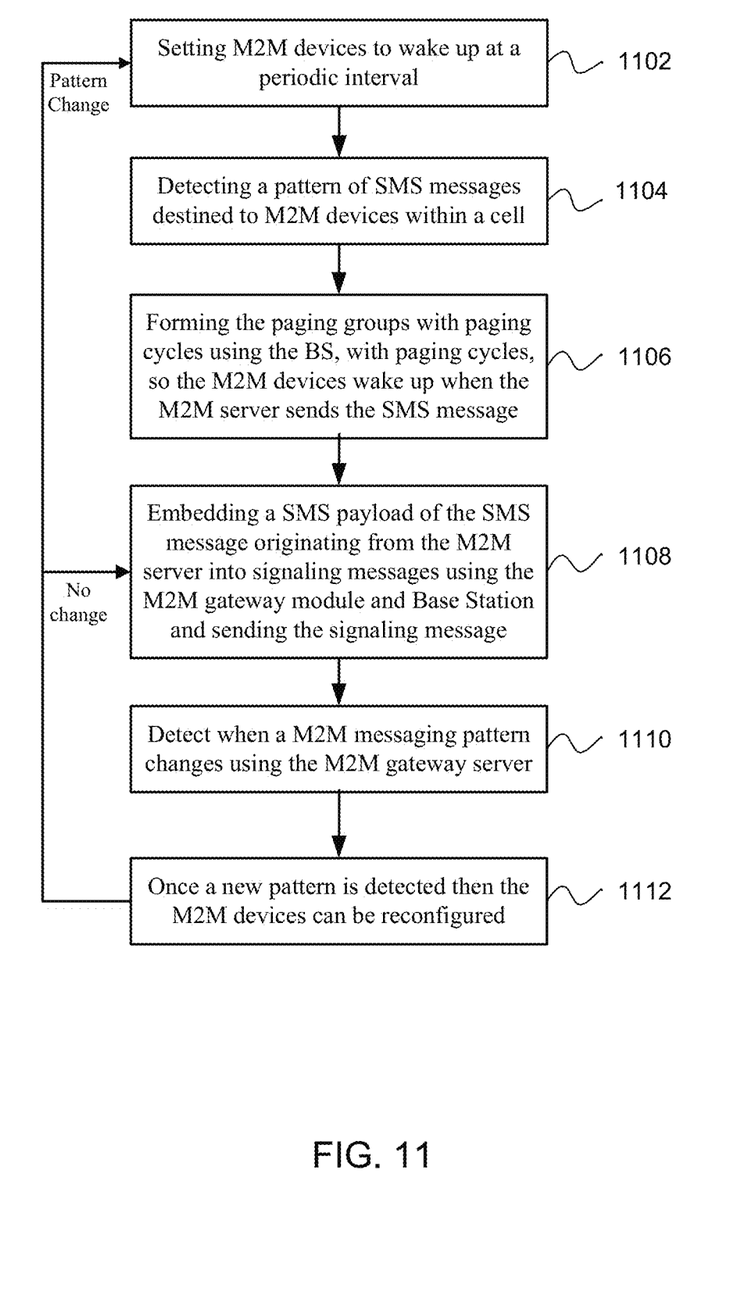
FIG. 11 illustrates an example of adaptive paging cycles according to useful M2M traffic patterns.

FIG. 10 illustrates an example of adaptive paging cycles according to desirable M2M traffic patterns. M2M GWF divides 2000 smart meters into 80 paging groups, ranging from PG#1 to PG#80. Each paging group has the same paging cycle of 24 hours, but a different paging offset indicates when the AAI-PAG-ADV message for each paging group is to be broadcast. Each paging group may consist of 25 smart meters. The assignment of smart meters to the paging group may be according to the order the SMSs are received from the SMCS. For example, the first 25 SMSs will be assigned to PG#1; the second 25 SMSs will be assigned to PG#2, and so on. This configuration method has the advantage of extending the paging cycles, which can prolong the battery life of M2M devices, without increasing the SMS latency.

Another major difference between M2M communications and human communications is that M2M communications can be at any time of day or night. In contrast, human being needs to take a break or sleep, but machines do not. Therefore, M2M load balancing can be achieved by sending the M2M data during the off-peak hours that can increase the bandwidth efficiency significantly. For example, the M2M gateway module can schedule M2M device paging for off-peak communication times in the wireless communication network. FIG. 10 shows an example of M2M load balancing. The M2M server may start reading the smart meters at 00:00 every day at a time when the bandwidth is inexpensive.

The solutions described above do not require signaling communication between the M2M server and M2M GWF, since the paging cycle and paging offset are automatically adjusted according to SMS traffic patterns. The only assumptions are that M2M server has to stick to the schedule and the sequence of M2M data retrievals. Alternatively, a paging schedule of an M2M device can be revised when the M2M server sends SMS messages to the M2M device at unexpected times. If the M2M server starts sending SMSs earlier or later than the scheduled time or out of sequence, the M2M GWF can assume the M2M server decided to change the reporting interval and can reset the paging cycle to 5 seconds or some default value. The M2M GWF may then reconfigure the paging cycles and paging offsets after tracking the new traffic patterns. During the transition period, there may be some delay in communications resulting from the paging cycle reset procedure. The scheduling or re-scheduling of M2M data transmissions between the M2M device and the M2M server can be performed using SMS messages to configure or reconfigure the paging cycles of the M2M device.

In recent years, SMS has become an important transmission mechanism for M2M communications, due to a mature wireless infrastructure and the ubiquity of cellular networks. This technology describes the use of SMS transmission optimization over a RAN. Specifically, telemetry applications can be achieved by simple read or write operations (e.g. power meter usage reading, setting the AC cooling temperature) from the M2M server. By analyzing the traffic patterns of both telemetry applications and human communications, the proposed technology can enable thousands of M2M devices and existing mobile users to operate harmoniously in a cell.

Telemetry applications can include smart metering, security, remote monitoring, ATM/POS (Point of Sale), vending machines, or tele-health and these markets represent a large share of the M2M market. As examples, this technology may optimize M2M communications for telemetry applications that can be achieved by simple read or write operations (e.g. smart meter usage reading, air condition temperature setting) from the M2M server. However, this technology can be used for other M2M device communications that can use short messages or small communication payloads.

An example overview method of adaptive scheduling technology can now be described. FIG. 10 illustrates a method that can be provided for setting M2M devices to wake up at a periodic interval, as in block 1102. For example, the M2M devices may wake up every 5 seconds or use some other default value. This setting is the default setting before the adaptive paging has been configured.

Then the M2M GWF or M2M gateway module can detects a pattern of SMS messages destined to M2M devices within a cell, as in block 1104. Accordingly, the M2M GWF or M2M gateway module can ask the BS to form the paging groups and set the paging cycles for the group, so the M2M devices can wake up at the time the M2M server is schedule to send the SMS message to M2M device, as in block 1106.

A further operation can be embedding a SMS payload of the SMS message originating from the M2M server into signaling messages using the M2M gateway module and Base Station, as in block 1108. When the signaling message can be sent from the M2M gateway module to the M2M device to communicate with the M2M device.

If it is detected that the M2M server sends SMS messages at unexpected times, sequences, or schedules, then the M2M devices will be reset to a 5 second paging interval and the pattern detection can resume. In other words, the M2M gateway module can detect when an M2M messaging pattern changes, as in block 1110. Once a new pattern is detected then the M2M devices can be reconfigured, as in block 1112. If no changes to the pattern are detected, then the embedding and sending of the SMS payloads in the signaling messages will continue.

Figure 12:
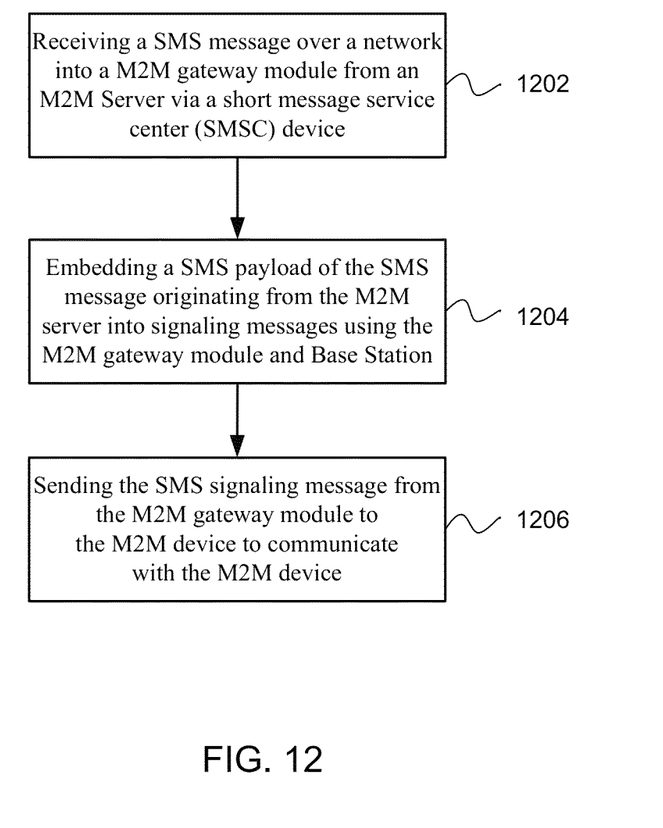
FIG. 12 is a flowchart illustrating a method of M2M communications using short message services (SMS) in accordance with an example.

FIG. 12 is a flowchart illustrating a method of machine-to-machine communications using short message services (SMS). The method can include the operation of receiving a SMS message over a network into an M2M gateway module, as in block 1202. The SMS message can originate from an M2M Server and travel to the M2M gateway module via a short message service center (SMSC) device.

A further operation can be embedding a SMS payload of the SMS message originating from the M2M server into signaling messages using the M2M gateway module and Base Station, as in block 1204. In one example, the payload for a signaling message can be in a range response message sent over a RAN (Radio Access Network) and the range response message can contain the SMS message. Using a signaling message (e.g., a range response message) avoids the overhead of setting up bearer channel over the RAN. The SMS message(s) can contain control point (write function) and sense point (read function) messages that are received by the M2M device via the M2M gateway module.

Then the signaling message can be sent from the M2M gateway module to the M2M device to communicate with the M2M device, as in block 1206. For example, the signaling messages can be sent over a radio access network (RAN) to the M2M device using wireless connections. In order for the M2M device to receive the signaling messages the M2M device can be woken up at a time set by an M2M gateway module to listen to a paging message.

The communications in a system for M2M communications using short message services (SMS) sent by an M2M server can also be viewed from the perspective of the M2M device. The M2M device can be configured to receive read and write operations contained in signaling messages from a machine-to-machine (M2M) gateway module over a network. The SMS messages from the machine-to-machine (M2M) gateway module can then be decoded into operations by the M2M device. Operations contained in the signaling messages received by the M2M device can then be performed. For example, sensor data may retrieve or a room temperature may be changed. An acknowledgement of the operations performed in response to operation requests in the signaling messages can then be sent back to the M2M gateway module by the M2M device.

Figure 13:
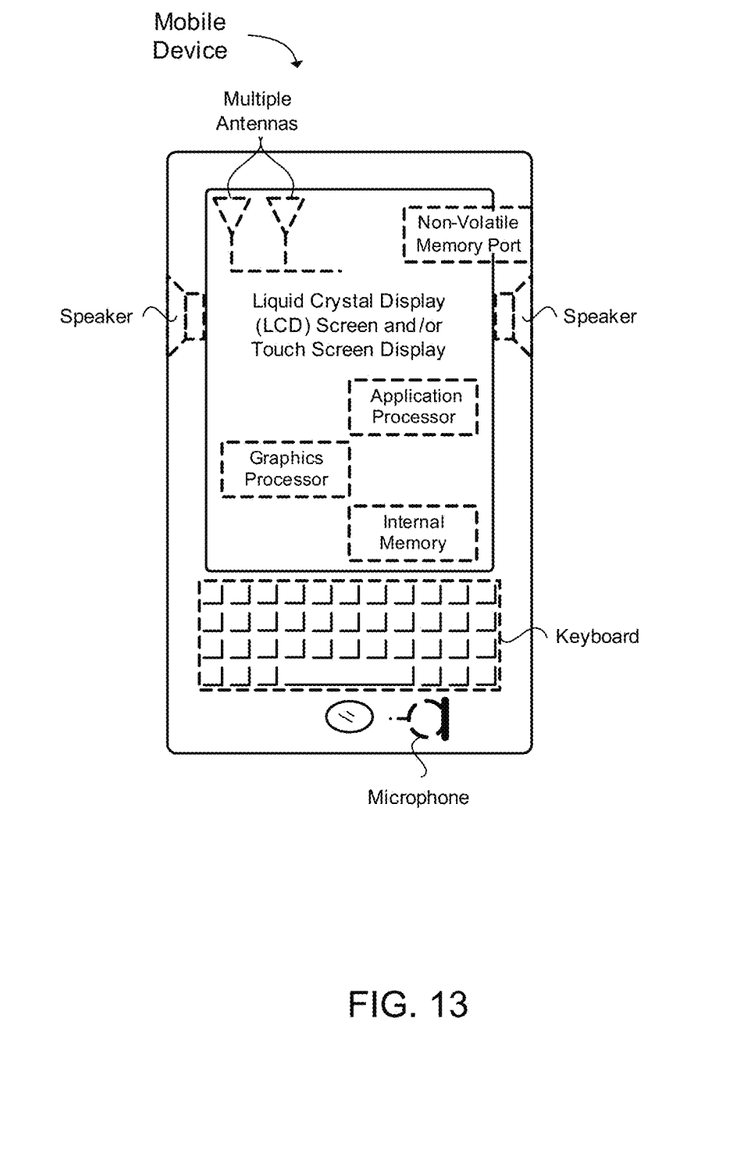
FIG. 13 illustrates an example of an M2M device or mobile device.

FIG. 13 provides an example illustration of an M2M device or mobile device, such as a user equipment (UE), a mobile station (MS), a mobile wireless device, a mobile communication device, a tablet, a handset, or other type of mobile wireless device. AN M2M device may include some or all of the features described below for a mobile device, and M2M devices may be small enough to be actually mobile or the described mobile technology components may be embedded in a device that is less mobile (e.g., a heating and air condition system, a refrigerator, etc.) The mobile device can include one or more antennas configured to communicate with a base station (BS), an evolved Node B (eNB), or other type of wireless wide area network (WWAN) access point. The mobile device can be configured to communicate using at least one wireless communication standard including 3GPP LTE, WiMAX, Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN).

FIG. 12 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A method of machine-to-machine communications using short message services (SMS), comprising:
 receiving, at a machine-to-machine (M2M) gateway module of a base station, a SMS message from an M2M Server via a short message service center (SMSC) device;
 embedding, at the M2M gateway module of the base station, a SMS payload of the SMS message a signaling message; and
 sending, from the M2M gateway module of the base station to an M2M device, the signaling messages that includes the SMS payload, wherein the signaling message includes control point commands with write functions and the sense point commands with read functions for the M2M device.

2. A method as in claim 1, further comprising sending the SMS payload to the M2M device in a range response message over a RAN (Radio Access Network).

3. A method as in claim 1, wherein the M2M device wakes up at a time set by the M2M gateway module of the base station to listen for a paging message from the base station.

4. A method as in claim 1, further comprising sending the SMS payload to the M2M device in the signaling messages over a RAN (Radio Access Network) without setting up a bearer channel over the RAN.

5. A system for machine-to-machine communications using short message services (SMS), comprising:
 a machine-to-machine (M2M) gateway module of a base station configured to:
 receive, from an M2M server, SMS messages that include operation messages, wherein the SMS messages are received from the M2M server via a short message service center (SMSC);
 embed SMS payloads of the SMS messages into signaling messages; and
 send, to an M2M device, the signaling messages that include the SMS payloads over a radio access network (RAN),
 wherein the M2M gateway module of the base station is configured to control scheduling of M2M data transmissions between the M2M device and the M2M server using a SMS messages pattern to reconfigure paging cycles of the M2M device.

6. The system as in claim 5, wherein the operation messages include read messages with sense points for the M2M device.

7. The system as in claim 6, wherein the read messages include an operation bit code representing a read operation and multiple bits representing sense operations.

8. The system as in claim 5, wherein the operation messages include write messages with control points for the M2M device.

9. The system as in claim 8, wherein the write messages include an operation bit code representing a write operation and multiple bits representing control operations.

10. The system as in claim 5, wherein the base station is an enhanced NodeB configured to operate based on 3GPPP LTE specification releases 8, 9 or 10 or a base station configured to operate based on Institute of Electrical and Electronics Engineers (IEEE) 802.16 standard, releases IEEE 802.16 2009 or IEEE 802.16m 2011.

11. The system as in claim 5, wherein an M2M application executes on the M2M server to manage SMS messages sent to the M2M device through the M2M server.

12. The system as in claim 5, wherein the M2M device is scheduled to wake up from idle mode and transition into a paging mode at a time defined by a SMS traffic pattern at the M2M gateway module of the base station.

13. The system as in claim 5, wherein multiple paging messages from the M2M server can be combined into a single signaling message by the M2M gateway module of the base station and the single signaling message is broadcasted to multiple M2M devices.

14. The system as in claim 5, wherein polling services of the M2M server are coordinated with paging cycles of M2M device as set by the M2M gateway module of the base station.

15. A device for machine-to-machine communications using short message services (SMS), comprising:
a machine-to-machine (M2M) gateway module configured to:
  receive signaling messages from an M2M server which are destined for a machine-to-machine (M2M) device,
  wherein the signaling messages include read and write operations;
  receive a SMS message with an SMS payload from the M2M server;
  embed the SMS payload of the SMS message into the signaling messages received from the M2M server; and
  send the signaling messages to the M2M device, wherein the signaling messages include the SMS payload and the read and write operations,
  wherein the M2M gateway module identifies a traffic pattern of SMS messages for the M2M device and configures M2M device paging cycles to match the traffic pattern.

16. The device as in claim 15, further comprising a short message service center to forward the SMS message received from the M2M server on to the M2M gateway module.

17. The device as in claim 15, wherein the M2M gateway module divides a plurality of M2M devices into paging groups and each paging group is assigned a defined paging cycle time schedule.

18. The device as in claim 15, wherein the M2M gateway module schedules M2M device paging for off-peak communication times in the wireless communication network to support load balancing.

19. The device as in claim 15, wherein a paging schedule of the M2M device is set by the M2M gateway module based on a history of when the M2M server sends SMS messages to the M2M device.

20. The device as in claim 15, wherein a paging schedule of the M2M device is revised when the M2M server sends SMS messages to the M2M device at unexpected times, sequence, or schedule.

21. A device for machine-to-machine communications using short message services (SMS) sent by an M2M server, comprising:
a machine-to-machine (M2M) device configured to:
  receive read and write operations contained in signaling messages from a machine-to-machine (M2M) gateway module as sent by an M2M server over a network;
  decode SMS messages from the machine-to-machine (M2M) gateway module into operations;
  perform the operations contained in a payload of the signaling messages to the M2M device using wireless communication network; and
  send an acknowledgement of operations performed in response to operation requests in the signaling messages.

22. The device of claim 21, wherein the M2M device further comprises a mobile device configured to connect to at least one of a wireless local area network (WLAN), a wireless personal area network (WPAN), and a wireless wide area network (WWAN), wherein the mobile device includes an antenna, a touch sensitive display screen, a speaker, a microphone, a graphics processor, an application processor, internal memory, a non-volatile memory port, and combinations thereof.

* * * * *